US006254076B1

(12) United States Patent
Goldin

(10) Patent No.: US 6,254,076 B1
(45) Date of Patent: Jul. 3, 2001

(54) TELESCOPICALLY EXTENDING AND RETRACTING DEVICE FOR THE PROTECTION OF MOVING MACHINE PARTS

(75) Inventor: Walter Goldin, Laives (IT)

(73) Assignee: P.E.I. Protezioni Elaborazioni Industriali S.r.l., Bologna (IT)

( * ) Notice: Subject to any disclaimer, the term of this patent is extended or adjusted under 35 U.S.C. 154(b) by 0 days.

(21) Appl. No.: 09/232,958

(22) Filed: Jan. 19, 1999

(30) Foreign Application Priority Data

Jan. 30, 1998 (IT) .............................................. B098A0045

(51) Int. Cl.[7] ..................................................... B25B 1/24
(52) U.S. Cl. ............................ 269/285; 269/244; 269/160
(58) Field of Search .................................... 269/285, 244, 269/43; 160/166, 202, 188

(56) References Cited

U.S. PATENT DOCUMENTS

| | | | | |
|---|---|---|---|---|
| 1,126,864 | * | 2/1915 | Rankin | 160/188 |
| 1,446,188 | * | 2/1923 | Lang | 160/166 |
| 2,480,415 | * | 8/1949 | Mettler | 269/285 |
| 2,531,797 | * | 11/1950 | Wellman | 160/166 |
| 2,876,834 | * | 3/1959 | Walker | 160/166 |
| 3,078,917 | * | 2/1963 | Recchione | 160/188 |
| 5,156,195 | * | 10/1992 | Wehler et al. | 160/202 |

\* cited by examiner

*Primary Examiner*—Joseph J. Hail, III
*Assistant Examiner*—Lee Wilson
(74) *Attorney, Agent, or Firm*—Fay, Sharpe, Fagan, Minnich & McKee, LLP

(57) ABSTRACT

A device to protect apparatus has a movable section moved alternately by drive means housed in a fixed casing of said apparatus, this alternating motion relative to the fixed casing creating an opening that expands and contracts in a lengthwise direction. The protection device comprises: a plurality of protection elements each having at least one covering portion designed to transversally close said opening and extending lengthwise; means for fixing one end of the protection device to the apparatus; and means for fixing the opposite end of the protection device to the movable part of the apparatus, retaining means also being envisaged for connecting adjacent protection elements to one another and designed to allow the plurality of protection elements to telescopically extend and retract so as to close off said opening lengthwise as the opening expands and contracts.

3 Claims, 4 Drawing Sheets

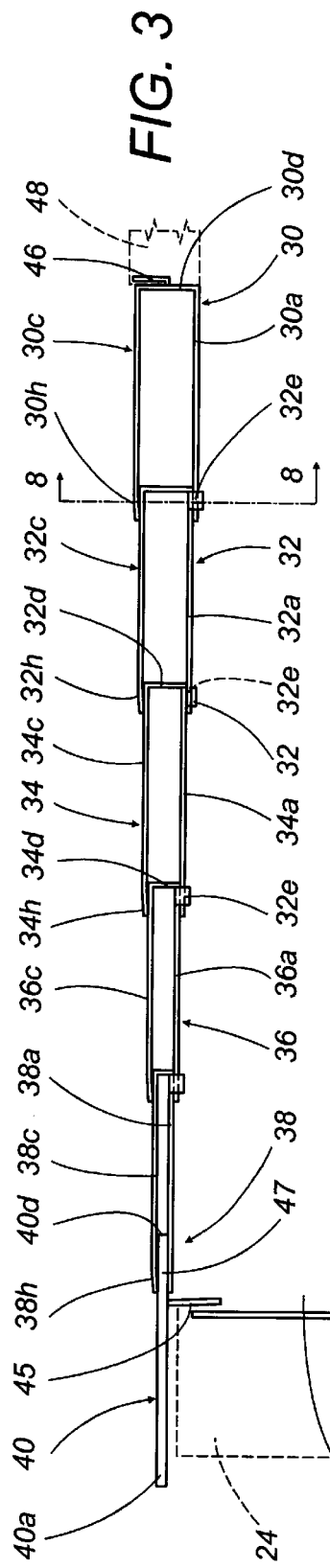
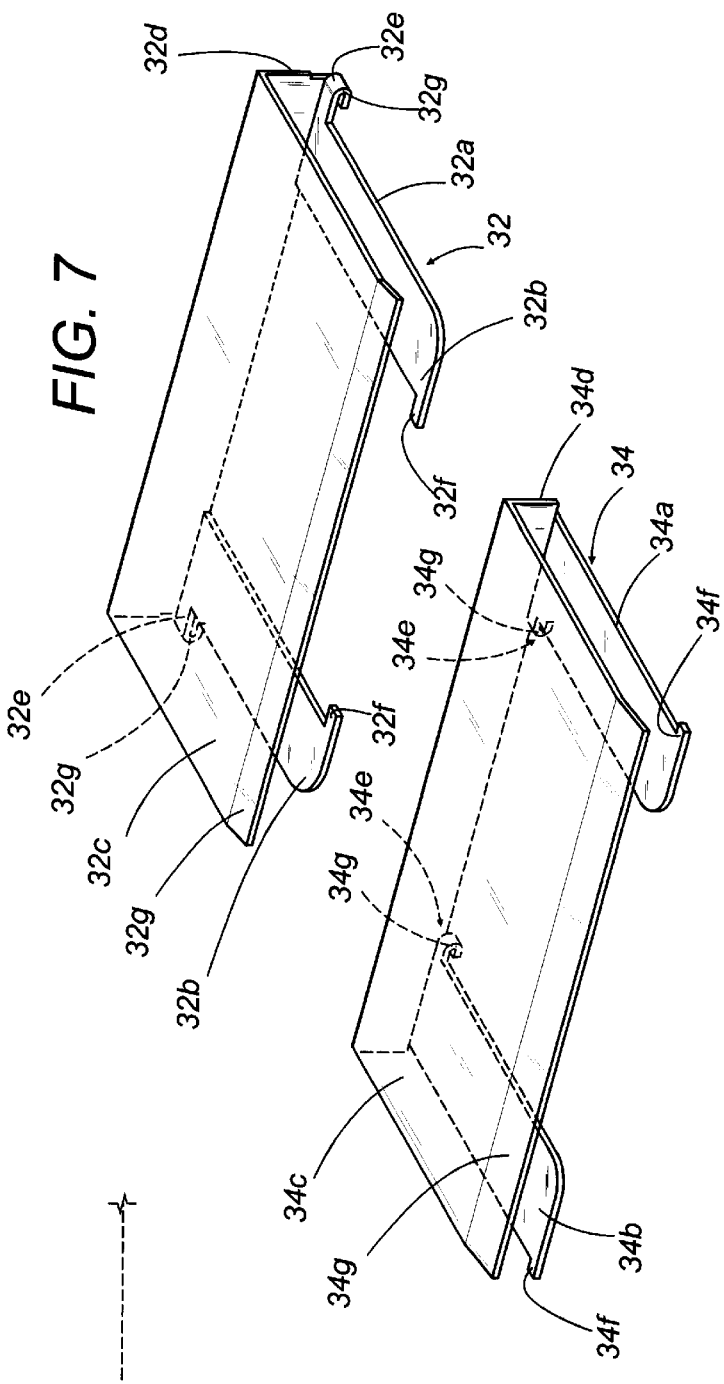

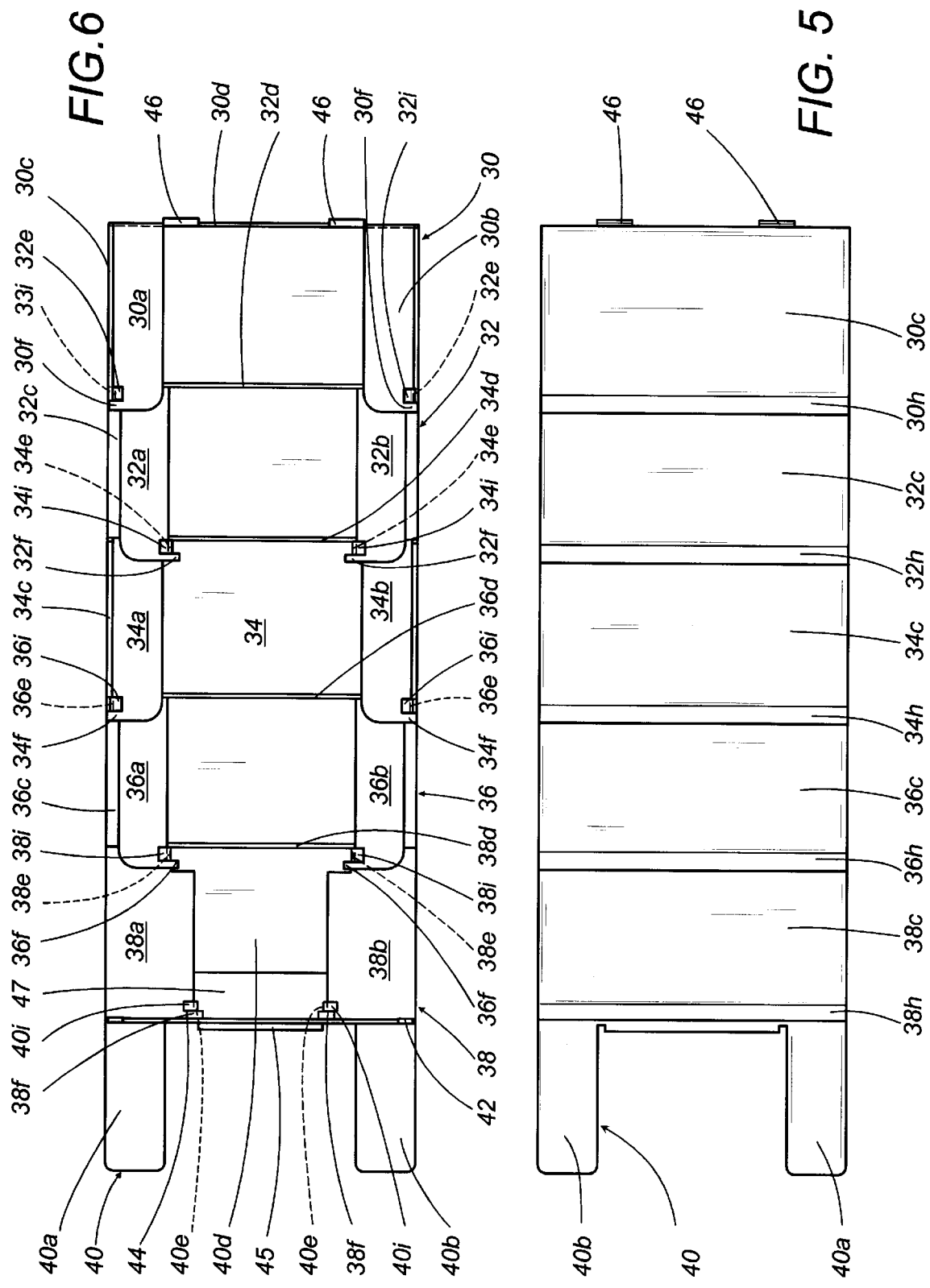

TELESCOPICALLY EXTENDING AND RETRACTING DEVICE FOR THE PROTECTION OF MOVING MACHINE PARTS

BACKGROUND OF THE INVENTION

The present invention relates to a device for the protection of moving machine parts.

In a machine tool or other manufacturing machine, the moving parts, especially the drive parts, are generally required to be protected by a suitable device or movable appliance, which, following the movements of the machine, keeps the moving parts shut off from the outside environment in order to prevent accidents to personnel working on or near the machine, to prevent dirt or other objects from coming into contact with the moving parts, thus reducing machine efficiency, and to prevent damage due to splashing of lubricant or other material.

Various different types of protective devices are known. These include devices designed to cover an opening in a casing which houses moving machine parts, this opening expanding and contracting at least in a lengthwise direction while the machine is working. These devices comprise a set of flat covering plates which protect the working parts of the machine located in the housing.

In these known protection devices, the covering plates as a whole are able to move between an extended position in which the plates are lined up lengthwise and completely close the opening, thus covering the working parts of the machine, and a retracted position in which the plates are gathered up over one another.

To enable the linear extension and retraction movements of the plurality of covering plates, protection devices of this kind have separate lateral mounting blocks with grooves in them. The lengthwise edges of each plate are inserted into the corresponding grooves so that the plates can slide backwards and forwards in separate parallel planes.

The main drawbacks of a protection device of this kind, used for closing flat openings, stem from the large number of parts which it consists of. This is in itself a major disadvantage but is closely connected to another major disadvantage due to the fact that, to close an opening of variable size on working apparatus, a suitable number of mounting blocks must be fitted beforehand on the sides of the opening in a plane above that in which the opening itself lies. The resulting structure can be extremely bulky and, indeed, a protection device of this kind cannot be applied to working apparatus at all unless sufficient room is provided to accommodate these cumbersome, lateral mounting blocks.

Another serious disadvantage is that chips and swarf from machining operations tend to settle in the the grooves in the mounting blocks, causing the protection plates to jam and, in the long run, making the protection device unusable.

The present invention has for an object to overcome the above mentioned drawbacks.

SUMMARY OF THE INVENTION

This object is achieved by providing a protection device, especially for apparatus with a moving part driven alternately by drive means housed in a fixed casing, so as to form an opening that, during operation, expands and contracts lengthwise relative to the fixed housing as a result of the alternate movements; said protection device being characterized in that it comprises: a plurality of protection elements each having at least one covering portion designed to transversally close said opening and extending lengthwise; means for attaching one end of the plurality of protection elements to the fixed part of the housing; and means for attaching the opposite end of the plurality of protection elements to the movable part of the apparatus; the protection device further comprising retaining means for connecting adjacent protection elements to one another and designed to allow the plurality of protection elements to telescopically extend and retract so as to close off said opening lengthwise as the opening expands and contracts.

A protection device made in this way, that extends and retracts telescopically, does not require additional lateral mounting blocks and therefore has a much simpler structure than previously known devices. Another advantage is that it can be mounted inside the opening in the fixed housing, which means that it can be used in confined spaces on apparatus to which the known devices of the kind describe above cannot be applied.

Another advantage of the protection device disclosed herein is that it does not jam on account of chips and swarf as is the case with known devices.

The present invention also relates to an apparatus and a vise that mount the present protection device, respectively.

The dependent claims refer to specific, advantageous embodiments of the invention.

BRIEF DESCRIPTION OF THE DRAWINGS

Further characteristics and advantages of the invention are apparent from the detailed description which follows, with reference to the accompanying drawings, which illustrate a preferred embodiment of the invention and in which:

FIG. 3 is a side view, with parts in cross section, of the preferred embodiment of the present protection device, shown in the extended position;

FIG. 5 is a top view of the preferred embodiment of the present protection device, shown in the extended position;

FIG. 6 is a bottom view of the preferred embodiment of the present protection device, shown in the extended position;

FIG. 7 is an exploded view of a pair of adjacent protection elements of the preferred embodiment of the present protection device;

DESCRIPTION OF THE PREFERRED EMBODIMENTS

Figure 1:
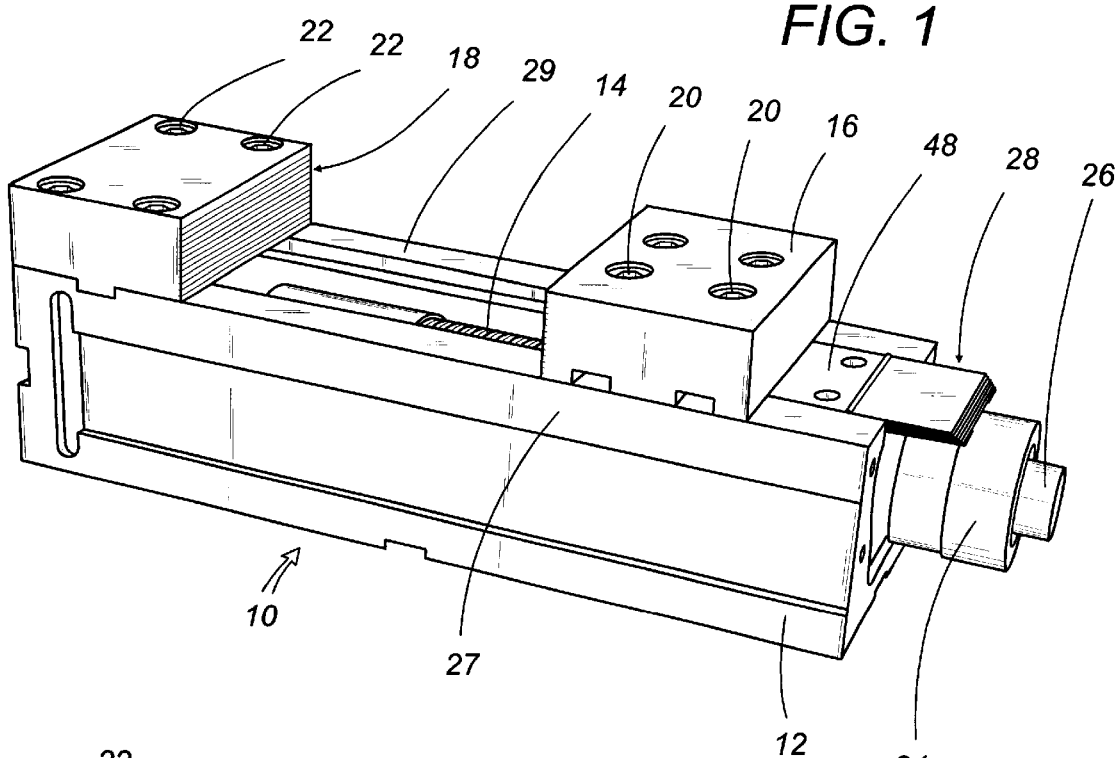
FIG. 1 is a perspective view of the vise that mounts the preferred embodiment of the present protection device, shown in the retracted position.
Figure 2:
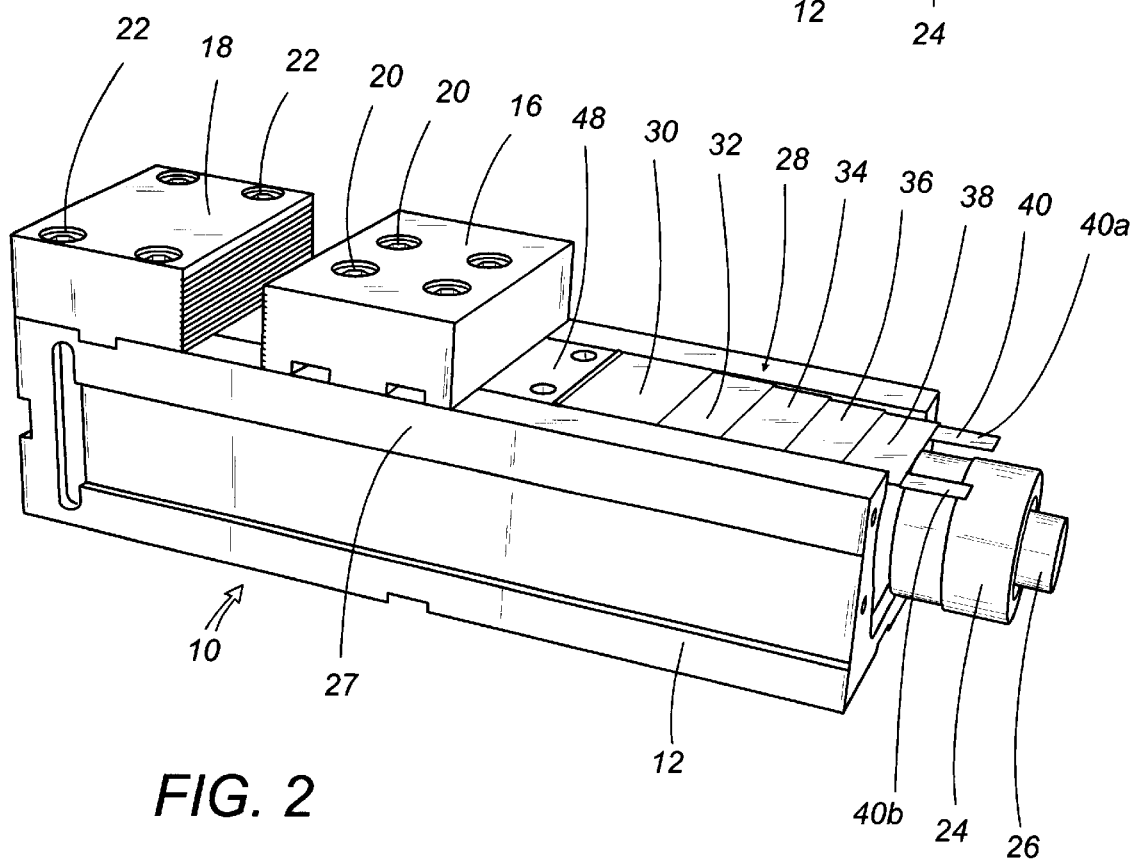
FIG. 2 is a perspective view of the vise that mounts the preferred embodiment of the present protection device, shown in the extended position.

FIGS. 1 and 2 show an apparatus 10, namely a vise, comprising a fixed body or casing 12 which houses a longitudinal lead screw 14 that drives a movable block 16 in a straight line towards a second, fixed block 18 attached to the casing 12, the blocks having holes 20 and 22 in them so that screws can be inserted into them in order to mount corresponding jaws (not illustrated) used to securely hold parts to be worked.

The vise illustrated here also envisages a tubular element 24 attached to the casing 12, protruding from one end of it and coaxially mounting, in such a way that it can freely rotate, an external extension 26 of the lead screw designed to be driven by the output shaft of a motor or by equivalent drive means.

As it moves along in a straight line, the jaw mounting block 16 creates an opening behind it which expands and contracts in a lengthwise direction during work and which is covered over by the protection device 28 made according to a preferred embodiment of the present invention. In FIG. 1, the protection device 28 is shown in a gathered up or retracted condition where almost all of it protrudes from the casing 12, while in FIG. 2, it is shown in an extended condition where it completely covers the variable size opening.

These two figures, in particular FIG. 1, show that the extensible protection device slides, if necessary guided as it extends and retracts, between the top edges of two opposite longitudinal walls 27, 29 of the casing which houses the lead screw.

Also, the top part of the casing 12 is preferably open at the end where the protection device is attached to the fixed part of it so that the protection device can protrude from it and, when gathered up in the retracted position, can be supported on the outside of it.

FIG. 2 in particular shows that the protection device 28 is made up of a plurality of protection elements consisting, in this preferred embodiment, of a first end protection element 30 attachable to the movable jaw mounting block 16 and a set of intermediate protection elements, labelled 32, 34, 36 and 38 located between the first end protection element 30 and a supporting end element 40 which can be attached to the fixed part of the apparatus, in this case, to the protruding tubular element 24, as described in more detail below.

With reference also to FIGS. from 3 to 8, it can be seen that each protection element in turn comprises a covering portion, labelled 30c, 32c, 34c, 36c, 38c wide enough to tranversally cover the opening and extending for a certain length.

In the preferred embodiment illustrated here, to enable the covering device to move between the sidewalls 27 and 29 of the casing, there are retaining means for connecting adjacent or consecutive protection elements to one another and allowing the plurality of protection elements to telescopically extend and retract by holding one protection element to the adjacent or consecutive element while at the same time letting them slide over one another.

With reference to FIGS. 6 and 7 in particular, the retaining means of each protection element comprise a first and a second longitudinal sliding element, labelled 30a, 30b, 32a, 32b, 34a, 34b, 36a, 36b, 38a, 38b, consisting of flexible rectangular sliding and retaining strips positioned under the corresponding covering portions 30c, 32c, 34c, 36c, 38c and pressing the adjacent protection element against the underside of the covering portion of each protection element.

Said first and second longitudinal sliding and retaining strips protrude from the opposite longitudinal edges of the corresponding covering portions in such a way that the first and second strips of all the protection elements are longitudinally aligned and so that the inner or upper surface of each strip slides against the outer or lower surface of the longitudinal strip of the next protection element, as clearly shown in FIG. 3.

In the preferred embodiment described here, there is a pair of longitudinal sliding and retaining strips for each protection element to connect all the protection elements to one sliding and another. However, each protection element might instead have only one retaining strip or more than two sliding and retaining strips.

The retaining strips 30a, 30b, 32a, 32b, 34a, 34b, 36a, 36b, 38a, 38b of each protection element protrude from the latter in a lengthwise direction and are fixed at one end to the corresponding covering portion 30c, 32c, 34c, 36c, 38c thanks to substantially perpendicular fixing portions, labelled 30d, 32d, 34d, 36d and 38d in FIG. 6. Hence, it is possible to obtain covering portions whose width may be completely independent of the shape of the corresponding retaining means and which may, as in this case, be constant for all the covering portions, so as to form a protection device which spans the full width of the opening between the walls 27 and 29 along the entire length of the opening.

The above mentioned fixing portions 30d, 32d, 34d, 36d and 38d also have the effect of transversally stiffening the covering portions.

The perpendicular fixing portions 30d, 32d, 34d, 36d and 38d are long enough to enable them to be inserted between the retaining means 30a, 30b, 32a, 32b, 34a, 34b, 36a, 36b, 38a, 38b and the covering portions 30c, 32c, 34c, 36c, 38c of the adjacent or consecutive elements 32, 34, 36, 38, 40.

The perpendicular fixing portions 30d, 32d, 34d, 36d and 38d consist of an edge of the flat covering portion folded down at right angles at one end of the protection element in such a way as to form a surface against which each protection element 30, 32, 34, 36, 38 stops against each adjacent or consecutive protection element 32, 34, 36, 38, 40 when they slide over each other to reach the retracted position.

With reference in particular to FIGS. 3, 6, 7 and 8, it can be seen that to guide each protection element 30, 32, 34, 36, 38 during extension and retraction, the protection elements 32, 34, 36, 38 are equipped with first and second guide elements labelled 32e, 32e, 34e, 34e, 36e, 36e, 38e, 38e acting sideways in opposite directions on the longitudinal sliding and retaining strips of the preceding protection element, that is to say, on the strips 30a, 30b, 32a, 32b, 34a, 34b, 36a, 36b.

Said first strips 30a, 32a, 34a, 36a, 38a and second strips 30b, 32b, 34b, 36b, 38b of the protection elements are aligned lengthwise in such a way that the strips of any two adjacent protection elements are laterally offset from each other and so that the side guide elements 32e, 32e and 36e, 36e can act on the longitudinal edges of the retaining strips 30a, 30b, 34a, 34b of the preceding element which are bent transversally towards the outside of the protection device, while the side guide elements 34e, 34e, 38e, 38e act on the longitudinal edges of the retaining strips 32a, 32b, 36a, 36b of the preceding element which are bent transversally towards the inside of the protection device.

To guide the retaining strips 38a and 38b of the protection element 38, the end support element 40 is equipped with similar guide elements 40e, 40e which act on the longitudinal edges bent transversely towards the inside of the retaining strips 38a and 38b of the preceding element.

As illustrated, the side guide elements 32e, 32e, 34e, 34e, 36e, 36e, 38e, 38e, 40e, 40e protrude perpendicularly from the strips of the corresponding protection elements and consist of short longitudinal portions.

As clearly shown in FIGS. 6 and 7, means are also envisaged for stopping the extension of the protection elements when the protection device is in the extended position, said means comprising, on each protection element, transverse portions or teeth 30f, 30f, 32f, 32f, 34f, 34f, 36f, 36f, 38f, 38f which protrude from the free end of the corresponding retaining strips 30a, 30b, 32a, 32b, 34a, 34b, 36a, 36b, 38a, 38b, said teeth coming into contact with an opposing stop part made on the transverse vertical edge of corresponding side guide elements 32e, 34e, 36e, 38e, 40e. Only the edges 32g, 32g and 34g, 34g are shown in FIG. 7 by way of example.

There are also perpendicular retaining and guide means acting on each longitudinal sliding strip to keep it in contact with the strip of the adjacent protection element. Said perpendicular retaining and guide means acting on each longitudinal sliding and retaining strip 32, 34, 36, 38 and on the end support element 40, comprise for each longitudinal sliding strip 30a, 30b, 32a, 32b, 34a, 34b, 36a, 36b, 38a, 38b a corresponding element 32i, 32i, 34i, 34i, 36i, 36i, 38i, 38i, 40i, 40i, extending transversally from the free end of a perpendicular side guide element 32e, 32e, 34e, 34e, 36e, 36e, 38e, 38e, 40e, 40e and designed to slide on the underside of the corresponding longitudinal strip 30a, 30b, 32a, 32b, 34a, 34b, 36a, 36b, 38a, 38b.

Figure 4:
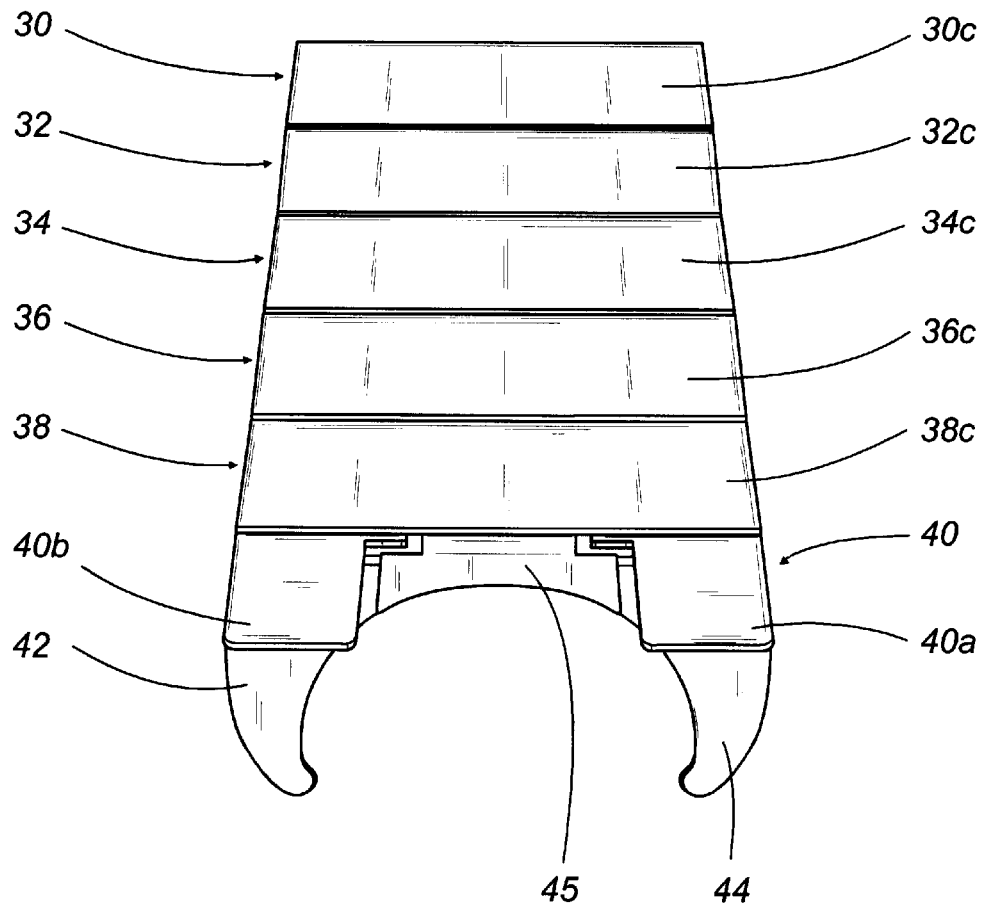
FIG. 4 is a front perspective view of the preferred embodiment of the present protection device, shown in the extended position.
Figure 8:
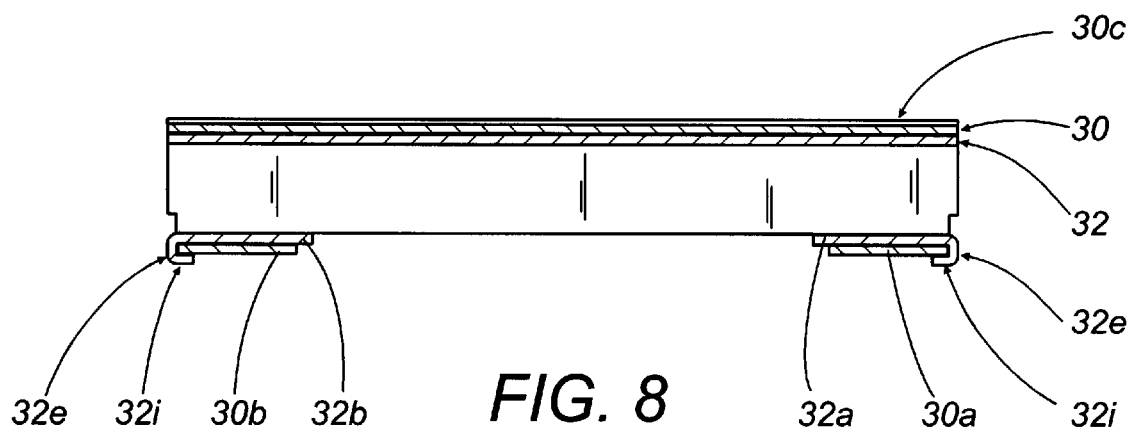
FIG. 8 is a view of FIG. 3 in cross section through line 8-8.

As shown in FIGS. 3, 4 and 6, the end element 40 of the protection device is attached to the fixed part 24 of the apparatus by attachment means comprising opposing jaws 42, 44 extending downwards from the end support element 40 and yielding elastically in such a way that they can be inserted into the fixed part 24, their inner profile being arc-shaped to adapt to the circular shape of the fixed part 24.

In particular, these opposing gripper jaws 42 and 44 are mounted on the end support element 40 by a flat portion 45 (shown in FIGS. 3 and 4) extending substantially perpendicular close to the rear end of the end element 40 so that when the plurality of protection elements are in the retracted position, they are supported on the outside of the aforementioned opening, as clearly shown in FIG. 1, thanks to the longitudinal side elements 40a, 40b in which the strips 38a and 38b of the preceding protection element 38 are slidably supported.

In particular, as shown in FIG. 3, said flat portion 45 is substantially perpendicular but inclined slightly towards the front of the protection device in such a way as to exert an opposing force which keeps the protection device, when fitted, substantially within the area bounded by the sidewalls of the apparatus.

As clearly shown in FIG. 6, the end support element 40 also has a flat portion 47 having, on the side facing the preceding protection element 38, a stop edge 40d which comes into contact with the portion 38d of the preceding protection element 38.

Appropriate means are also envisaged for attaching the first end protection element to the movable part of the apparatus. They comprise (see FIGS. 3 and 6) a pair of hook-like elements 46 which are inserted into corresponding slots made in a flat portion 48 that is integral with the movable mounting block 16.

The drawings also show clearly that each protection element 30c, 32c, 34c, 36c, 38c consists of a small flat plate, substantially quadrilateral in shape and having a transversal edge 30h, 32h, 34h, 36h, 38h slightly inclined or curved downwards so as to make good contact with the top surface of the corresponding covering portion 32c, 34c, 36c, 38c of the adjacent protection element or with the flat portion 47 of the support element 40 in order to create a hermetic seal between the covering portions.

Each protection element in the present protection device is preferably made from metal plate suitably formed by shearing and bending. However, other materials, such as, for example, a suitable plastic, and any other forming process could be effectively used for the present invention.

The invention described can be subject to modifications and variations without thereby departing from the scope of the inventive concept Moreover, all the details of the invention may be substituted by technically equivalent elements.

What is claimed is:

1. A protection device especially for apparatus with a moving part driven alternatively by drive means housed in a fixed housing, so as to form an opening that, during operation, expands and contracts lengthwise relative to the fixed housing as a result of the alternative movements; said protection device comprising:

a plurality of protection elements each having at least one covering portion designed to transversally close said opening and extending lengthwise;

means for attaching a first end of the plurality of protection elements to the fixed part of the housing;

means for attaching a second, opposite end of the plurality of protection elements to the movable part of the apparatus; and, retaining means for connecting adjacent protection elements to one another and designed to allow the plurality of protection elements to telescopically extend and retract so as to close off said opening lengthwise as they move from the extended to the retracted position, said retaining means comprising, on each protection element, at least one sliding and retaining element connected to the covering portion of the protection element and holding an adjacent protection element between itself and the covering portion connected thereto, wherein each longitudinal sliding and retaining element comprises a substantially rectangular strip.

2. A protection device especially for apparatus with a moving part driven alternatively by drive means housed in a fixed housing, so as to form an opening that, during operation, expands and contracts lengthwise relative to the fixed housing as a result of the alternative movements; said protection device comprising:

a plurality of protection elements each having at least one covering portion designed to transversally close said opening and extending lengthwise, wherein the at least one covering portion of each of the plurality of protection elements comprises a small flat plate, substantially quadrilateral in shape;

means for attaching a first end of the plurality of protection elements to the fixed part of the housing;

means for attaching a second, opposite end of the plurality of protection elements to the movable part of the apparatus; and, retaining means for connecting adjacent protection elements to one another and designed to allow the plurality of protection elements to telescopically extend and retract so as to close off said opening lengthwise as they move from the extended to the retracted position, said retaining means comprising, on each protection element, at least one sliding and retaining element connected to the covering portion of the protection element and holding an adjacent protection element between itself and the covering portion connected thereto.

3. A protection device, especially for apparatus with a moving part driven alternatively by drive means housed in a fixed housing, so as to form an opening that, during operation, expands and contracts lengthwise relative to the fixed housing as a result of the alternative movements; said protection device comprising:

a plurality of protection elements each having at least one covering portion designed to transversally close said opening and extending lengthwise;

means for attaching a first end of the plurality of protection elements to the fixed part of the housing;

means for attaching a second, opposite end of the plurality of protection elements to the movable part of the apparatus; and, retaining means for connecting adjacent protection elements to one another and designed to allow the plurality of protection elements to telescopically extend and retract so as to close off said opening lengthwise as they move from the extended to the retracted position, wherein the means for fixing the end of the plurality of protection elements to the movable part of the apparatus comprise at least one hook element protruding from the end of the end protection element of the plurality of protection elements.

* * * * *